(12) United States Patent
Akiyama et al.

(10) Patent No.: US 7,587,521 B2
(45) Date of Patent: *Sep. 8, 2009

(54) MECHANISM FOR ASSEMBLING MEMORY ACCESS REQUESTS WHILE SPECULATIVELY RETURNING DATA

(75) Inventors: James Akiyama, Beaverton, OR (US); William H. Clifford, Gig Harbor, WA (US)

(73) Assignee: Intel Corporation, Santa Clara, CA (US)

( * ) Notice: Subject to any disclaimer, the term of this patent is extended or adjusted under 35 U.S.C. 154(b) by 384 days.

This patent is subject to a terminal disclaimer.

(21) Appl. No.: 11/165,390

(22) Filed: Jun. 23, 2005

(65) Prior Publication Data
US 2006/0294264 A1    Dec. 28, 2006

(51) Int. Cl.
G06F 3/00 (2006.01)
G06F 5/00 (2006.01)
(52) U.S. Cl. .......................... 710/5; 710/56
(58) Field of Classification Search ............... 710/5, 710/56
See application file for complete search history.

(56) References Cited

U.S. PATENT DOCUMENTS

| | | |
|---|---|---|
| 3,323,109 A | 5/1967 | Hecht et al. |
| 3,988,717 A | 10/1976 | Kisylia |
| 4,051,461 A | 9/1977 | Hashimoto et al. |
| 4,059,850 A | 11/1977 | Van Eck et al. |
| 4,124,891 A | 11/1978 | Weller, III et al. |
| 4,495,570 A | 1/1985 | Kitajima et al. |
| 4,504,902 A | 3/1985 | Gallaher et al. |
| 5,251,310 A | 10/1993 | Smelser et al. |
| 5,325,510 A | 6/1994 | Frazier |
| 5,459,842 A | 10/1995 | Begun et al. |
| 5,526,507 A | 6/1996 | Hill |
| 5,649,157 A | 7/1997 | Williams |
| 5,761,708 A | 6/1998 | Cherabuddi et al. |
| 5,790,118 A | 8/1998 | Bertram |
| 5,905,725 A * | 5/1999 | Sindhu et al. ............... 370/389 |
| 5,913,231 A | 6/1999 | Lewis et al. |
| 6,061,773 A | 5/2000 | Harvey et al. |
| 6,076,139 A | 6/2000 | Welker et al. |

(Continued)

FOREIGN PATENT DOCUMENTS

JP    02067622    3/1990

OTHER PUBLICATIONS

Dave Pahl, "Maximizing Data Transfer Efficiency with C5000 DMA Controller", Sep. 12, 2001, pp. 10, 22, & 36.*

(Continued)

*Primary Examiner*—Henry W. H. Tsai
*Assistant Examiner*—Hyun Nam
(74) *Attorney, Agent, or Firm*—Blakely, Sokoloff, Taylor & Zafman LLP

(57) ABSTRACT

According to one embodiment, a memory controller is disclosed. The memory controller includes assignment logic and a transaction assembler. The assignment logic receives a request to access a memory channel and assigns the request to access one of two or more independently addressable subchannels within the channel. The transaction assembler combines the request with one or more additional requests to access the two or more independently addressable subchannels within the channel and facilitates a speculative return of data from a subchannel for which a subchannel request is not available.

14 Claims, 6 Drawing Sheets

U.S. PATENT DOCUMENTS

| | | | |
|---|---|---|---|
| 6,108,725 A * | 8/2000 | Chatter | 710/56 |
| 6,122,709 A | 9/2000 | Wicki et al. | |
| 6,145,065 A | 11/2000 | Takahashi et al. | |
| 6,151,641 A | 11/2000 | Herbert | |
| 6,249,851 B1 | 6/2001 | Richardson et al. | |
| 6,389,488 B1 | 5/2002 | Strongin et al. | |
| 6,430,672 B1 | 8/2002 | Dhong et al. | |
| 6,438,675 B1 | 8/2002 | Root et al. | |
| 6,453,380 B1 | 9/2002 | Van Lunteren | |
| 6,606,688 B1 * | 8/2003 | Koyanagi et al. | 711/137 |
| 6,643,746 B1 | 11/2003 | Bouquet | |
| 6,651,151 B2 | 11/2003 | Palanca et al. | |
| 6,708,248 B1 | 3/2004 | Garrett, Jr. et al. | |
| 6,745,272 B2 | 6/2004 | Owen et al. | |
| 6,862,672 B1 | 3/2005 | Furudate et al. | |
| 7,006,505 B1 * | 2/2006 | Bleszynski et al. | 370/395.72 |
| 7,130,229 B2 * | 10/2006 | Dahlen et al. | 365/200 |
| 2002/0078268 A1 * | 6/2002 | Lasserre | 710/22 |
| 2002/0188858 A1 | 12/2002 | Oerlemans | |
| 2003/0056058 A1 | 3/2003 | Veitch | |
| 2003/0142102 A1 | 7/2003 | Emberling | |
| 2003/0179598 A1 | 9/2003 | Chen | |
| 2003/0204679 A1 | 10/2003 | Blankenship | |
| 2003/0225970 A1 | 12/2003 | Hashemi | |
| 2003/0229821 A1 | 12/2003 | Ma | |
| 2004/0044857 A1 | 3/2004 | Jeddeloh et al. | |
| 2004/0078532 A1 * | 4/2004 | Tremaine | 711/160 |
| 2004/0142102 A1 * | 7/2004 | Banerjee et al. | 427/212 |
| 2005/0068844 A1 | 3/2005 | Roohparvar | |
| 2005/0080953 A1 * | 4/2005 | Oner et al. | 710/52 |
| 2005/0193293 A1 | 9/2005 | Shikata | |
| 2006/0294328 A1 | 12/2006 | Akiyama et al. | |

OTHER PUBLICATIONS

Lizy Kurian John, VaWiRAM: A Variable Width Random Access Memory Module, Jan. 1996, IEEE 9th International Conference on VLSI Design, pp. 219-224.*
U.S. Appl. No. 11/159,745, filed Jun. 23, 2005, Akiyama et al.
U.S. Appl. No. 11/159,741, filed Jun. 23, 2005, Akiyama et al.
Office Action U.S. Appl. No. 11/172,766, mailed May 27, 2008.
WEBOPEDIA, ""Main Memory"", http://www.webopedia.com/TERM/m/main_memory.html, (Jan. 15, 2002), 1-4.

* cited by examiner

MECHANISM FOR ASSEMBLING MEMORY ACCESS REQUESTS WHILE SPECULATIVELY RETURNING DATA

FIELD OF THE INVENTION

The present invention relates to computer systems; more particularly, the present invention relates to accessing memory control.

BACKGROUND

Computer systems implementing Unified Memory Architecture (UMA) feature a graphics controller that accesses main memory for video memory. However, the memory efficiency of UMA graphics systems may be limited due to CPU cache line size requirements. For example, the ideal memory access size for graphics may be 4 to 16 bytes, since graphics controllers can operate on one or a few pixels or texels at a time. Nevertheless, memory architectures are often optimized for the 64 byte CPU cache line size to optimize CPU memory efficiency. The result is that, on average, a significant amount of data read from memory may never used by the graphics controller.

Manufacturers of discrete graphics controllers minimize this over fetch by using narrower memory channels. This solution, however, is not available for UMA-based integrated graphics controllers.

BRIEF DESCRIPTION OF THE DRAWINGS

The invention is illustrated by way of example and not limitation in the figures of the accompanying drawings, in which like references indicate similar elements, and in which.

DETAILED DESCRIPTION

Speculative returns for memory transactions are described. In the following detailed description of the present invention numerous specific details are set forth in order to provide a thorough understanding of the present invention. However, it will be apparent to one skilled in the art that the present invention may be practiced without these specific details. In other instances, well-known structures and devices are shown in block diagram form, rather than in detail, in order to avoid obscuring the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Figure 1:
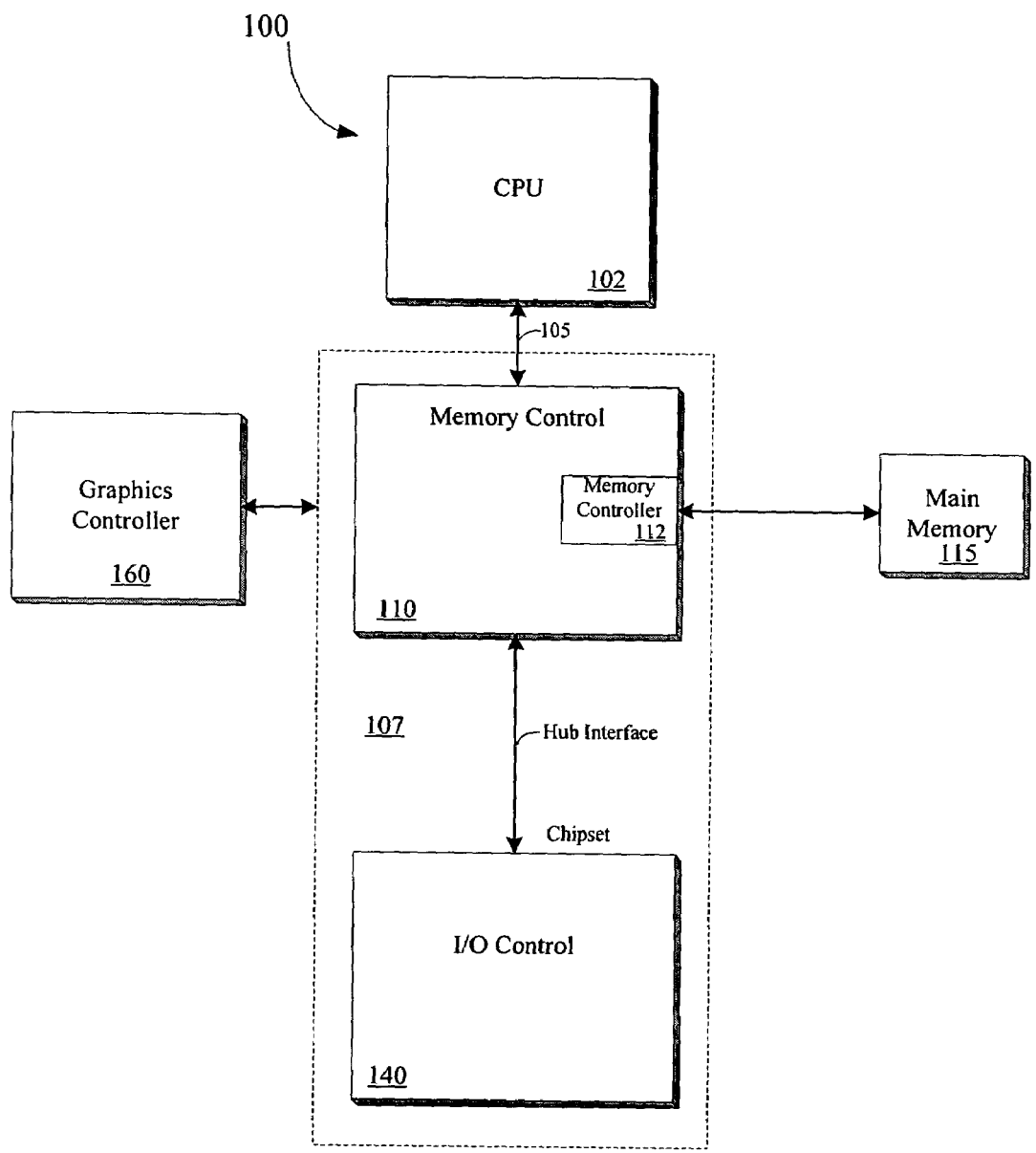
FIG. 1 is a block diagram of one embodiment of a computer system.

FIG. 1 is a block diagram of one embodiment of a computer system 100. Computer system 100 includes a central processing unit (CPU) 102 coupled to an interface 105. In one embodiment, CPU 102 is a processor in the Pentium® family of Pentium® IV processors available from Intel Corporation of Santa Clara, Calif. Alternatively, other CPUs may be used. For instance, CPU 102 may be implemented using multiple processing cores. In yet other embodiments, computer system 100 may include multiple CPUs 102

In a further embodiment, a chipset 107 is also coupled to interface 105. Chipset 107 includes a memory control component 110. Memory control component 110 may include a memory controller 112 that is coupled to a main system memory 115. Main system memory 115 stores data and sequences of instructions that are executed by CPU 102 or any other device included in system 100. In one embodiment, main system memory 115 includes dynamic random access memory (DRAM); however, main system memory 115 may be implemented using other memory types. Additional devices may also be coupled to interface 105, such as multiple CPUs and/or multiple system memories.

Memory control component 110 may be coupled to an input/output (I/O) control component 140 via an interface. I/O control component 140 provides an interface to I/O devices within computer system 100. I/O control component 140 may support standard I/O operations on I/O busses such as peripheral component interconnect (PCI) Express, accelerated graphics port (AGP), universal serial bus (USB), low pin count (LPC) bus, or any other kind of I/O bus (not shown).

According to one embodiment, graphics controller 160 is in communication with chipset 107 and is implemented to provide video graphics to a display monitor (not shown) coupled to computer system 100. Graphics controller 160 accesses main memory 115 for video memory. As discussed above, the memory efficiency of memory device supporting both a graphics system and a CPU is limited since memory access size for graphics is often ideally 4 to 16 bytes, while memory architectures are optimized for the 64 byte CPU line size to optimize CPU memory efficiency.

According to one embodiment, memory control component 110 reduces memory request size for graphics devices, while maintaining 64 byte memory transactions. A standard memory channel, such as based on DDR DRAM technology, has some physical width of m bits. A memory transaction is composed of T transfers for a total logical width of M=m*T/8 bytes. The bytes within each transaction are considered to have consecutive addresses. In subsequent discussion, the term width means the logical width.

Micro-Tiling breaks the M byte wide channel into S subchannels that are each N=M/S bytes wide and where N bytes of data are transferred on each subchannel. An address is presented to each subchannel, in which some number, I, of independent address bits may be different from corresponding bits in the addresses presented to the other subchannels. The data transferred on each subchannel is considered to represent a contiguous address range. However, the blocks of data on each subchannel are not necessarily from a contiguous address range. Each subchannel includes a subset of the total memory locations of the channel.

Figure 2:
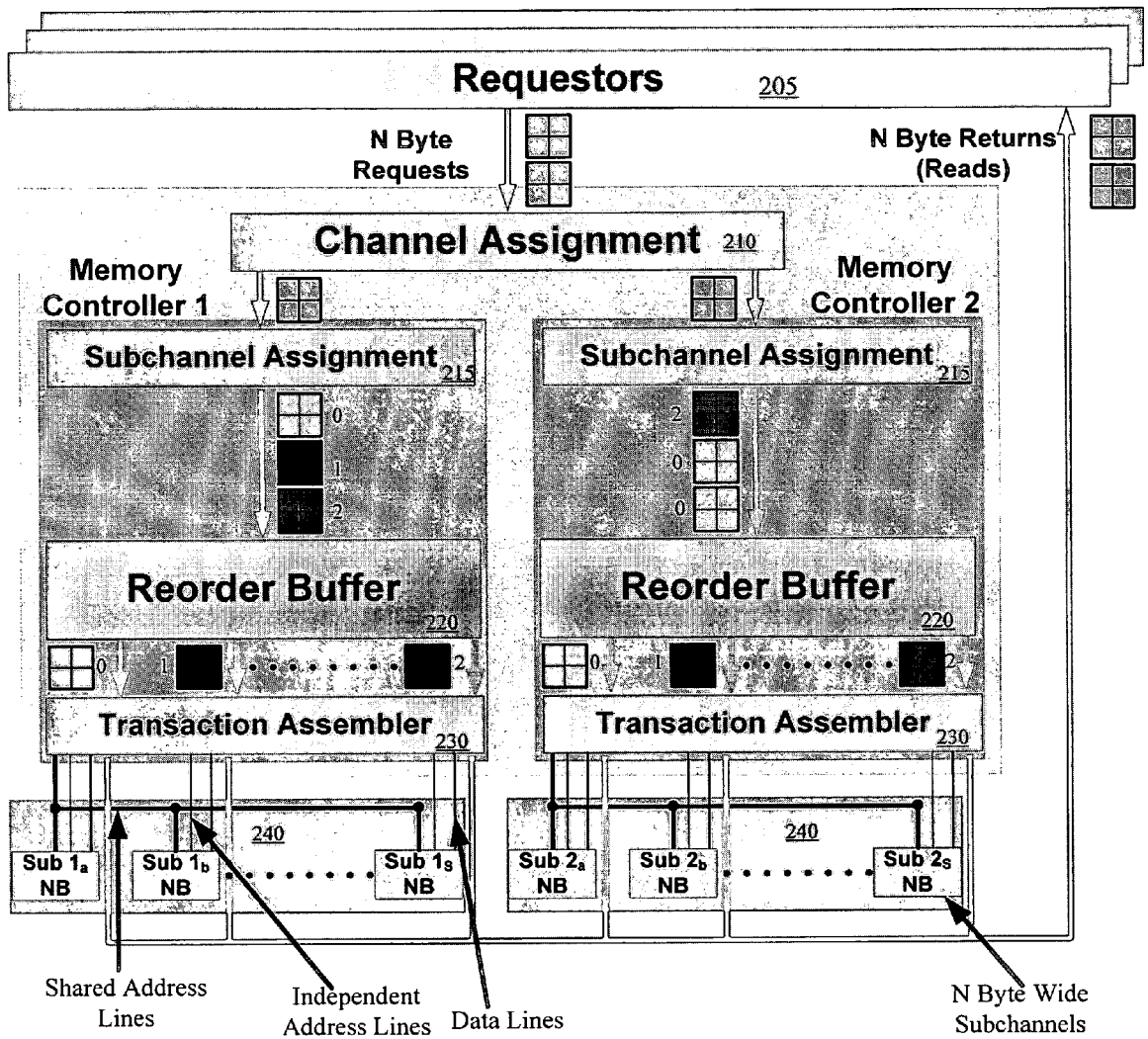
FIG. 2 illustrates one embodiment of a memory controller

FIG. 2 illustrates one embodiment of an memory control component 110 supporting Micro-Tiling. In one embodiment, a multi-channel memory subsystem has a Micro-Tiling memory controller per channel. Thus, as illustrated in FIG. 2, memory control component 110 includes two memory controllers 112 (memory controllers 1 and 2), one for each of the two channels. Each channel includes S subchannels, each N bytes wide. Thus each channel is M=N*S bytes wide.

In this figure, requests to read or write memory are depicted as 2×2 arrays of squares possibly representing a 2×2 array of pixels or texels. Requests are shown before being assigned to a subchannel. After subchannel assignment, requests are numbered 0-S−1 to suggest subchannel assignment. The N byte returns to requester 205 coupled to memory control component 110 occur in the case of a read transaction.

Memory control component 110 includes channel assignment logic 210 coupled to memory controllers 112. Channel assignment 210 assigns each request received from requester 205 to a memory channel 240 via a memory controller 112. Further, each memory controller 112 includes subchannel assignment 215, reorder buffer 220 and transaction assembler 230. Thus, requests are assigned to memory controller 1 or memory controller 2 shown in FIG. 2.

Sub-channel assignment 215 assigns each request to a sub-channel within a memory channel 240. Reorder buffer 220 collects requests to enable transaction assembler 230 to attempt to assemble memory accesses for each memory 240 subchannel. According to one embodiment, each subchannel has an equal N byte width.

During operation of the system shown in FIG. 2, a request to read or write a block of N bytes of data at address A enters a memory controller (1 or 2) is assigned to a subchannel and is placed in a reorder buffer 220. In one embodiment, the Identity Subchannel Assignment, s, is defined by the following process: the request address, A, is shifted right by $P=\log_2(N)$ bits, resulting in a new integer value $\tilde{A}$ (e.g., $\tilde{A}=\tilde{A}>>P$); and s is the least significant $Q=\log_2(S)$ bits of $\tilde{A}$ (e.g., $s=\tilde{A}$ & $((1<<Q)-1)$).

The memory controller forms a memory read transaction by selecting S read requests, one for each subchannel, from the reorder buffer 220. The memory controller forms a memory write transaction by selecting S write requests, one for each subchannel, from reorder buffer 220. The portion of the address represented by shared address lines is the same for all subchannel requests in the transaction.

Figure 3:
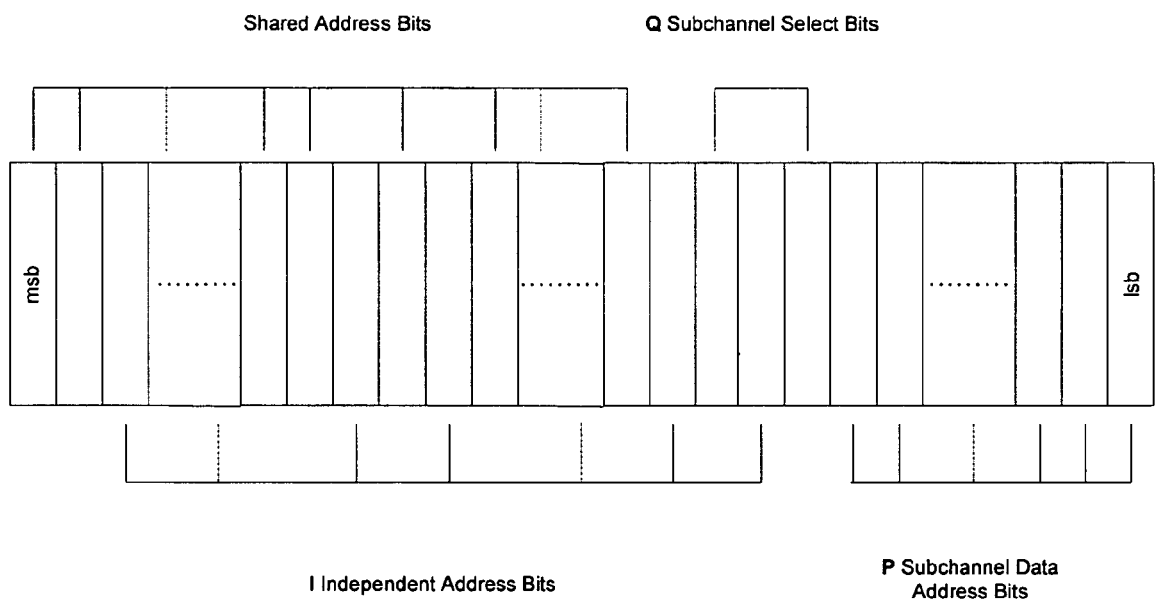
FIG. 3 illustrates one embodiment of a logical virtual address.

FIG. 3 illustrates one embodiment of an interpretation of address bits in a physical address. The choice of shared and independent address bits, and subchannel select bits shown in FIG. 3 is for illustrative purposes since the division of the address bits above the P subchannel data address bits into shared and independent address bits, and subchannel select bits is arbitrary. The independent address bits are different across subchannels, and are not necessarily contiguous. The address bits sent to a subchannel are the shared address bits and the independent address bits of that subchannel.

Figure 4:
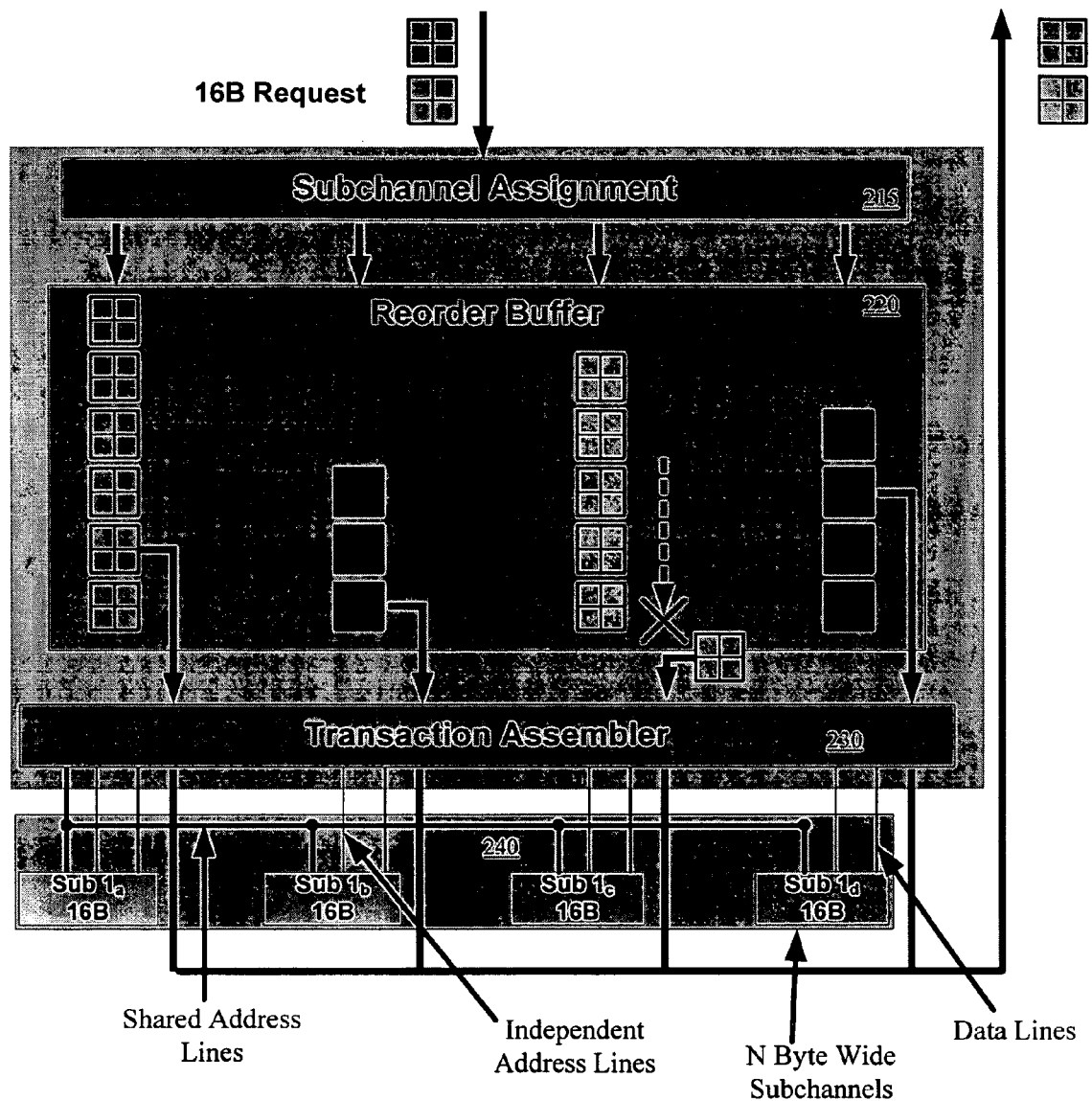
FIG. 4 illustrates another embodiment of a memory controller.

FIG. 4 illustrates an embodiment of memory control component 110 assembling a 64 byte transaction from four 16 byte requests with only a single channel being shown. FIG. 4 shows reorder buffer 220 implemented as a reorder queue for each subchannel. However, in other embodiments, reorder buffer 220 may be implemented via other mechanisms.

In this embodiment, transaction assembler 230 constructs a 64 B memory request from 16 B requests, one for each subchannel. All 16 B requests forming the memory request have the same shared address bits. Thus assembler 230 looks into the queue for requests that can be assembled into a single transaction based upon whether requests have a common shared address.

Note that in the embodiment shown in FIG. 4, assembler 230 cannot find a request for subchannel 1c. When attempting to form a transaction, the memory controller may not be able to find a request for each subchannel such that all have the same shared address segment (e.g., such that the value of each shared address bit is the same across all requests). A subchannel at which such an event occurs may be referred to as an "empty" subchannel.

According to one embodiment, if a subchannel cannot be filled by a request in the corresponding queue, the effect is that no transfer is performed from/to that subchannel. In such an embodiment, if a subchannel cannot be filled by a request an arbitrary location is read and the results are discarded. In an alternative embodiment, an additional control line is included per subchannel, which is used to power down a subchannel when there is no corresponding request to that channel.

In yet another embodiment, speculative reads are performed and returned to a requester, rather than the retrieved data being discarded. A speculative return involves reading an N byte block of data on an otherwise unused subchannel and returning the data to some requester as for any other read request. Therefore, a memory controller may choose to read on the otherwise "empty" subchannel any aligned N byte block of data that has the same shared address bits as the data being accessed on the other subchannels in the same memory transaction, and making this data available for use by some requester.

According to one embodiment, a speculative return is implemented at transaction assembler 230 by assigning to the independent address lines associated with the "empty" subchannel, the independent address bits of a neighboring subchannel, resulting in two N byte blocks of data, having the same shared and independent address bits, being returned. Although described above as duplicating independent address lines, other embodiments may implement other mechanisms for choosing a block of data that is speculatively returned.

Referring to FIG. 4 as an example, a request cannot be found for subchannel 1c. Thus, subchannel 1c is an "empty" subchannel. In the disclosed embodiment, transaction assembler 230 assigns the independent address bits of subchannel 1d to subchannel 1c and returns the data subchannel 1c to the requester associated with subchannel 1d. Thus, the speculative return improves effective memory utilization by performing speculative subchannel reads and returning the result to the requester. If this data is later needed by the requester, it may already/still be held, for example in a cache.

The Micro-Tiling memory subchannels can access discontiguous memory addresses within some address ranges determined by the shared address bits and the I independent address bits. A judicious choice of I can therefore provide the increased concurrency and bandwidth efficiency of independent subchannels, balanced against the cost of duplicating I address signals to each subchannel.

Figure 5A:
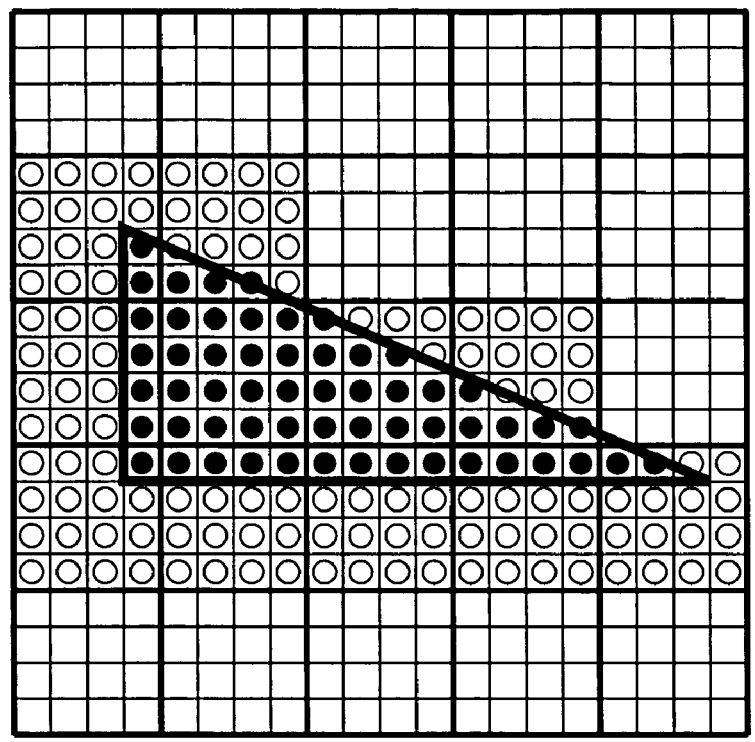
FIGS. 5A & 5B illustrate performance benefits.
Figure 5B:
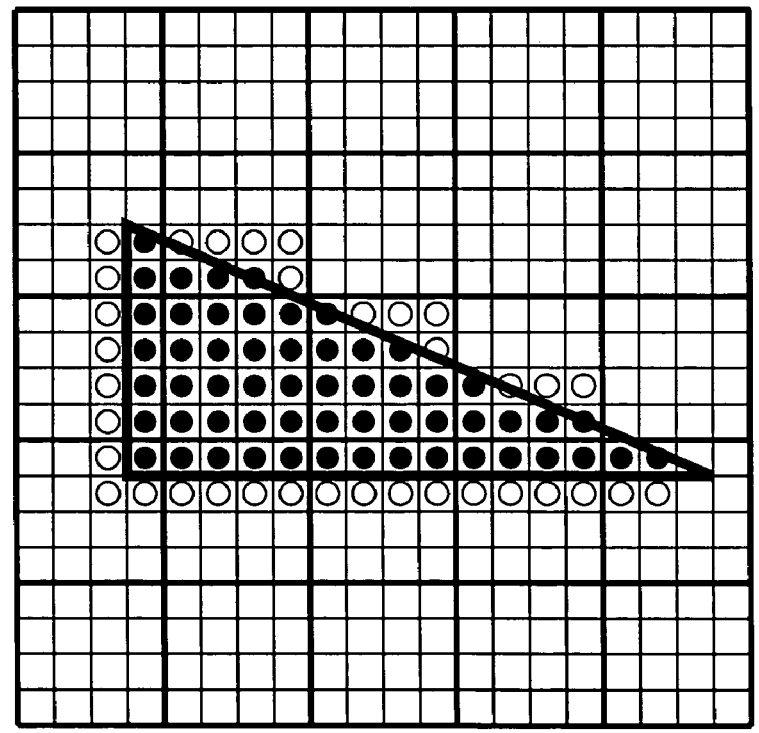

FIGS. 5A & 5B illustrate performance benefits for Micro-Tiling. Each figure shows the rasterization of a triangle in a tiled address space, with each small square representing a 4 byte pixel or texel. FIG. 5A shows overfetch in a standard memory system when requests are 64 bytes each. Each 4×4 block of pixels represents a 64 byte aligned block of memory. The triangle encompasses 57 pixels. With a standard memory subsystem, those 57 pixels are in 11 (64 byte) blocks of memory. Thus, in order to access those 57 pixels, an additional 119 pixels worth of data is accessed that may not be used (e.g., resulting in 32% efficiency).

FIG. 5B shows the over fetch if requests are 16 bytes each and if all such requests can be utilized by the Micro-Tile Assembler to build 64 byte memory transactions with no unused subchannels. In this case, the triangle touches 23 2×2 pixel arrays, resulting in 35 additional pixels worth of data being accessed (e.g., resulting in 62% efficiency). The effectiveness of Micro-Tiling depends on the ability of the Assembler to construct fully populated memory transactions.

Figure 6:
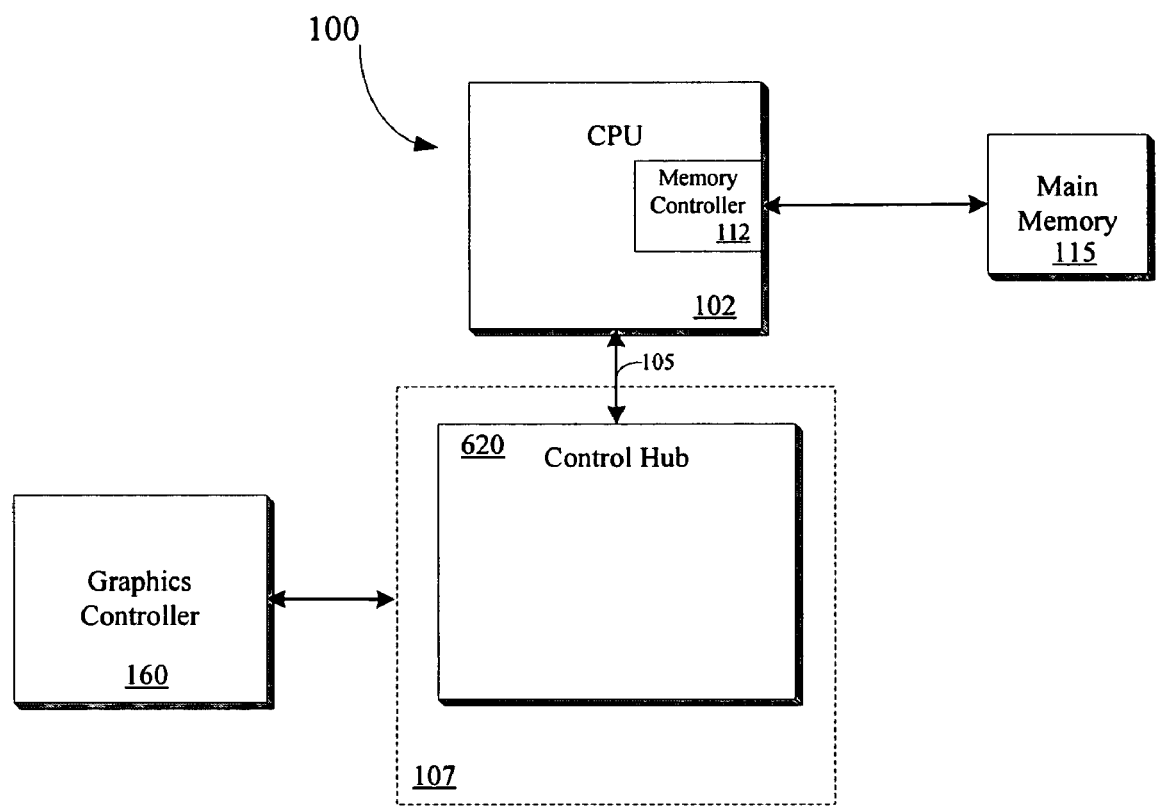
FIG. 6 is a block diagram of another embodiment of a computer system.

FIG. 6 illustrates another embodiment of computer system 100. In this embodiment, chipset 107 includes a single control hub 620 as opposed to a separate memory control component and I/O control component. Consequently, memory controller 112 is included within CPU 102, with memory 115 being coupled to CPU 102. In such an embodiment, graphics controller 160 is coupled to control hub 620 and accesses main memory 115 via CPU 102

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as essential to the invention.

What is claimed is:

1. A memory controller comprising:
   requestors;
   channel assignment logic to receive a first request and a second request to access a memory channel within a memory device and having subchannel assignment logic to assign the first request to access a first independently addressable subchannel within the channel and to assign the second request to access a second independently addressable subchannel;
   a reorder buffer to store the requests; and
   a transaction assembler to combine the first request with a first set of additional requests to access a first independently addressable subchannel within a channel of the memory device and to combine the second request with a second set of additional requests to access a second independently addressable subchannel within the memory device and to facilitate a speculative return of data from a third independently addressable subchannel to one of the requestors wherein the third independently addressable subchannel was an unused subchannel prior to the speculative return.

2. The memory controller of claim 1 wherein each of the subchannel requests includes an independent address component and a shared address component.

3. The memory controller of claim 1 wherein the transaction assembler facilitates the speculative return of data from the third independently addressable subchannel to the requestor by selecting the independent address component of the subchannel for which a request is not be available.

4. The memory controller of claim 3 wherein the data speculatively read from the subchannel for which a request is not available, is returned to a requester.

5. The memory controller of claim 1 wherein the reorder buffer includes a queue for each of the two or more subchannels.

6. The memory controller of claim 5 wherein each queue stores requests to be transferred to a subchannel.

7. A method comprising:
   channel assignment logic assigning memory channels to requests from requestors;
   receiving a first request at a memory controller to access a memory channel coupled to the memory controller;
   receiving a second request at the memory controller to access the memory channel; subchannel assignment logic assigning the first requests to a first independently addressable subchannel within the memory channel;
   the subchannel assignment logic assigning the second request to a second independently addressable subchannel;
   storing the requests in a reorder buffer after assigning each of the requests to a subchannel;
   a transaction assembler combining the first request with one or more additional requests to access the first subchannel;
   combining the second request with one or more additional requests to access the second subchannel; and
   speculatively returning data from a third independently addressable Subchannel to one of the requestors wherein the third independently addressable subchannel was an unused subchannel prior to the speculative return.

8. The method of claim 7 wherein the process of speculatively returning data from the third independently addressable subchannel to the selector comprises selecting the independent address component for the subchannel for which a request is not be available.

9. The method of claim 7 further comprising forwarding the requests to the subchannels after assembling the requests.

10. A system comprising:
    a memory device comprising one or more channels; and
    a chipset, coupled to the memory device, comprising a memory controller including:
    channel assignment logic to receive a first request and a second request to access a memory channel and having subchannel assignment logic to assign the first request to access a first independently addressable subchannel within the channel and to assign the second request to access a second independently addressable subchannel;
    a reorder buffer to store the requests; and
    a transaction assembler to combine the first request with a first set of additional requests to access a first independently addressable subchannel within a channel of the memory device and to combine the second request with a second set of additional requests to access a second independently addressable subchannel within the memory device and to facilitate a speculative return of data from a third independently addressable subchannel to one of the requestors wherein the third independently addressable subchannel was an unused subchannel prior to the speculative return.

11. The system of claim 10 wherein the reorder buffer includes a queue for each of the two or more subchannels.

12. The system of claim 10 wherein the transaction assembler facilitates the speculative return of data from the third independently addressable subchannel to the requestor by selecting the independent address component for the subchannel for which a request is not be available.

13. The system of claim 10 further comprising a requester coupled to the memory device and the memory controller, wherein the data speculatively read from the subchannel for which a request is not available is returned to the requester.

14. The system of claim 10 wherein the chipset comprises a second memory controller to receive a request to access one of one or more memory channels and to assign the request to access one of two or more independently addressable subchannels within the channel.

* * * * *